(12) United States Patent
Lee (10) Patent No.: US 11,675,569 B2
(45) Date of Patent: Jun. 13, 2023

(54) RANDOM NUMBER GENERATOR

(71) Applicant: SAMSUNG ELECTRONICS CO., LTD., Suwon-si (KR)

(72) Inventor: Jaesoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/556,609

(22) Filed: Dec. 20, 2021

(65) Prior Publication Data

US 2022/0113947 A1 Apr. 14, 2022

Related U.S. Application Data

(63) Continuation of application No. 16/460,596, filed on Jul. 2, 2019, now Pat. No. 11,237,801.

(30) Foreign Application Priority Data

Dec. 28, 2018 (KR) .................. 10-2018-0173082

(51) Int. Cl.
*G06F 7/58* (2006.01)
*G01J 1/42* (2006.01)

(52) U.S. Cl.
CPC ............ *G06F 7/588* (2013.01); *G01J 1/4228* (2013.01)

(58) Field of Classification Search
CPC .... G06F 7/58; G06F 7/588; G01J 1/00; G01J 1/1626; G01J 1/4228; G01J 2001/442
USPC ........................................................ 708/255
See application file for complete search history.

(56) References Cited

U.S. PATENT DOCUMENTS

| | | | |
|---|---|---|---|
| 9,335,973 B2 | 5/2016 | Pooser | |
| 9,588,737 B2 | 3/2017 | Choi et al. | |
| 11,201,729 B2 * | 12/2021 | Hammon | ................. G06F 7/58 |
| 2005/0071400 A1 | 3/2005 | Ribordy et al. | |
| 2006/0288062 A1 | 12/2006 | Luo et al. | |
| 2012/0326116 A1 | 12/2012 | Ellis et al. | |
| 2014/0337400 A1 | 11/2014 | Chong et al. | |
| 2015/0193207 A1 | 7/2015 | Pooser | |

(Continued)

FOREIGN PATENT DOCUMENTS

| | | |
|---|---|---|
| CN | 1232905 C | 12/2005 |
| KR | 10-1564954 B1 | 11/2015 |

OTHER PUBLICATIONS

Communication dated Feb. 20, 2020, issued by the European Patent Office in counterpart European Application No. 19193659.0.

(Continued)

*Primary Examiner* — Emily E Larocque
(74) *Attorney, Agent, or Firm* — Sughrue Mion, PLLC (57) ABSTRACT

Provided is a random number generator including a single-photon emitter configured to emit single photons by pumping, a waveguide configured to guide the single photons emitted from the single-photon emitter to the inside of the waveguide, the waveguide including a first output terminal and a second output terminal that are respectively provided at both end portions of the waveguide, the single photons being output from the first output terminal and the second output terminal, and a first single-photon detector and a second single-photon detector respectively provided at the first output terminal and the second output terminal and configured to detect the single photons output from the first output terminal and the second output terminal, respectively.

17 Claims, 9 Drawing Sheets

(56) References Cited

U.S. PATENT DOCUMENTS

2015/0212798 A1  7/2015 Choi
2018/0232208 A1  8/2018 Chong

OTHER PUBLICATIONS

Jason Francis et al., "Quantum random number generation using on-chio plasminic beamsplitter", arvix.org, Cornell University Library, Ithica, NY, XP080816140, Oct. 20, 2016, 8 pages.

Jamie Crawford et al. "The U.S. government thinks China could take down the power grid" CNNPolitics, Nov. 21, 2014 (5 pages total).

Vivek Wadhwa "Quantum computing is about to overturn cybersecurity's balance of power" The Washington Post, May 11, 2015, (4 pages total).

K. Tanabe et al., Electrically pumped 1.3 urn room-temperature InAs/GaAs quantum dot lasers on Si substrates by metal-mediated wafer bonding and layer transfer, Optics Express, vol. 18, No. 10, 2010 (Year: 2010).

A. Fischer, Quantum Lecture Series, Single Photon Sources, SAND2015-0817PE, Sandia National Laboratories, 2015 (Year: 2015).

\* cited by examiner

RANDOM NUMBER GENERATOR

CROSS-REFERENCE TO RELATED APPLICATION

This application in a continuation of U.S. application Ser. No. 16/460,596, filed Jul. 2, 2019 in the U.S. Patent and Trademark Office, which claims priority from Korean Patent Application No. 10-2018-0173082, filed on Dec. 28, 2018 in the Korean Intellectual Property Office, the disclosure of which is incorporated herein in its entirety by reference.

BACKGROUND

1. Field

Example embodiments of the present disclosure relate to random number generators, and more particularly, to random number generators which may be implemented in a compact on-chip.

2. Description of the Related Art

Random numbers refer to numbers that do not have a specified order or rule and thus are difficult to predict. A random number is used in the fields of computer science, engineering, information security, etc. In particular, the random number may be useful for security authentication in the fields of financial services or telecommunication.

A conventional random number generator generates a random number by using a mathematical algorithm. However, it is a problem that the random number generated by the conventional random number generator can be predicted by a pseudo random number. Recently, a quantum random number generator, which may generate an unpredictable true random number by using a quantum mechanical principle, is being studied.

SUMMARY

One or more example embodiments provide random number generators which may be implemented in a compact on-chip.

Additional aspects will be set forth in part in the description which follows and, in part, will be apparent from the description, or may be learned by practice of example embodiments.

According to an aspect of an example embodiment, there is provided a random number generator including a single-photon emitter configured to emit single photons by pumping, a waveguide configured to guide the single photons emitted from the single-photon emitter to the inside of the waveguide, the waveguide including a first output terminal and a second output terminal that are respectively provided at both end portions of the waveguide, the single photons being output from the first output terminal and the second output terminal, and a first single-photon detector and a second single-photon detector respectively provided at the first output terminal and the second output terminal and configured to detect the single photons output from the first output terminal and the second output terminal, respectively.

Each of the single photons emitted from the single-photon emitter may be randomly output from one of the first output terminal and the second output terminal.

A random number may be generated based on a signal detected by the first single-photon detector and the second single-photon detector.

The single-photon emitter may be provided in the waveguide or outside of the waveguide.

The single photons emitted from the single-photon emitter may be formed directly in the waveguide.

The random number generator may further include a pumping source configured to pump the single-photon emitter.

The pumping source may include an optical pumping source configured to optically pump the single-photon emitter or an electrical pumping source configured to electrically pump the single-photon emitter.

The optical pumping source may include a laser light source.

The laser light source may include a laser diode.

The electrical pumping source may include a plurality of electrodes configured to apply an electric field to the single-photon emitter.

The random number generator may further include a resonator configured to optically amplify the single photons emitted from the single-photon emitter, the resonator being provided at the waveguide.

The single-photon emitter, the waveguide, the first single-photon detector, and the second single-photon detector may be provided on a substrate.

The substrate may include a semiconductor substrate.
The single-photon emitter may include a quantum dot.
The waveguide may include silicon or silicon oxide.
The first single-photon detector and the second single-photon detector respectively may include one of semiconductor detector, charge-coupled device, and photomultiplier tube detector.

According to an aspect of an example embodiment, there is provided a random number generator including a pumping source, a single-photon emitter configured to emit single photons by pumping of the pumping source, a waveguide configured to guide the single photons emitted from the single-photon emitter to the inside of the waveguide, the waveguide including a first output terminal and a second output terminal that are respectively provided at both end portions of the waveguide, the single photons being output from the first output terminal and the second output terminal, and a first single-photon detector and a second single-photon detector provided at the first output terminal and the second output terminal, respectively, and configured to detect the single-photons output from the first output terminal and the second output terminal, respectively.

The pumping source, the single-photon emitter, the waveguide, the first single-photon detector, and the second single-photon detectors may be provided on a substrate.

The pumping source may include an optical pumping source configured to optically pump the single-photon emitter or an electrical pumping source configured to electrically pump the single-photon emitter.

The single-photon emitter may be provided in the waveguide or outside of the waveguide.

The single-photon emitter may further include a quantum dot.

The random number generator may further include a resonator configured to optically amplify the single photons emitted from the single-photon emitter, the resonator being provided in the waveguide.

According to an aspect of an example embodiment, there is provided a random number generator including a light source configured to emit light, a single-photon emitter including a quantum dot and configured to emit single photons based on the quantum dot being irradiated by the light emitted from the light source, a waveguide configured to guide the single photons emitted from the single-photon emitter toward one of a first output terminal and a second output terminal that are respectively provided at both end portions of the waveguide, the single photons being output from the first output terminal and the second output terminal, and a first single-photon detector and a second single-photon detector provided at the first output terminal and the second output terminal, respectively, and configured to detect the single-photons output from the first output terminal and the second output terminal, respectively.

The single-photon emitter, the waveguide, the first single-photon detector, and the second single-photon detector may be provided on a substrate.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Reference will now be made in detail to example embodiments of which are illustrated in the accompanying drawings, wherein like reference numerals refer to like elements throughout. The thickness or size of each layer illustrated in the drawings may be exaggerated for convenience of explanation and clarity. In this regard, the example embodiments may have different forms and should not be construed as being limited to the descriptions set forth herein.

Hereinafter, when a constituent element is disposed "above" or "on" to another constituent element, the constituent element may be only directly on the other constituent element or above the other constituent elements in a non-contact manner. Also, terms such as "comprise" and/or "comprising" may be construed to denote a constituent element, but may not be construed to exclude the existence of or a possibility of addition of another constituent element.

The use of the terms "a" and "an" and "the" and similar referents in the context of describing the disclosure are to be construed to cover both the singular and the plural. Also, the steps of all methods described herein can be performed in any suitable order unless otherwise indicated herein or otherwise clearly contradicted by context. The present disclosure is not limited to the described order of the steps. The use of any and all examples, or language provided herein, is intended merely to better illuminate the disclosure and does not pose a limitation on the scope of the disclosure unless otherwise claimed.

Figure 1:
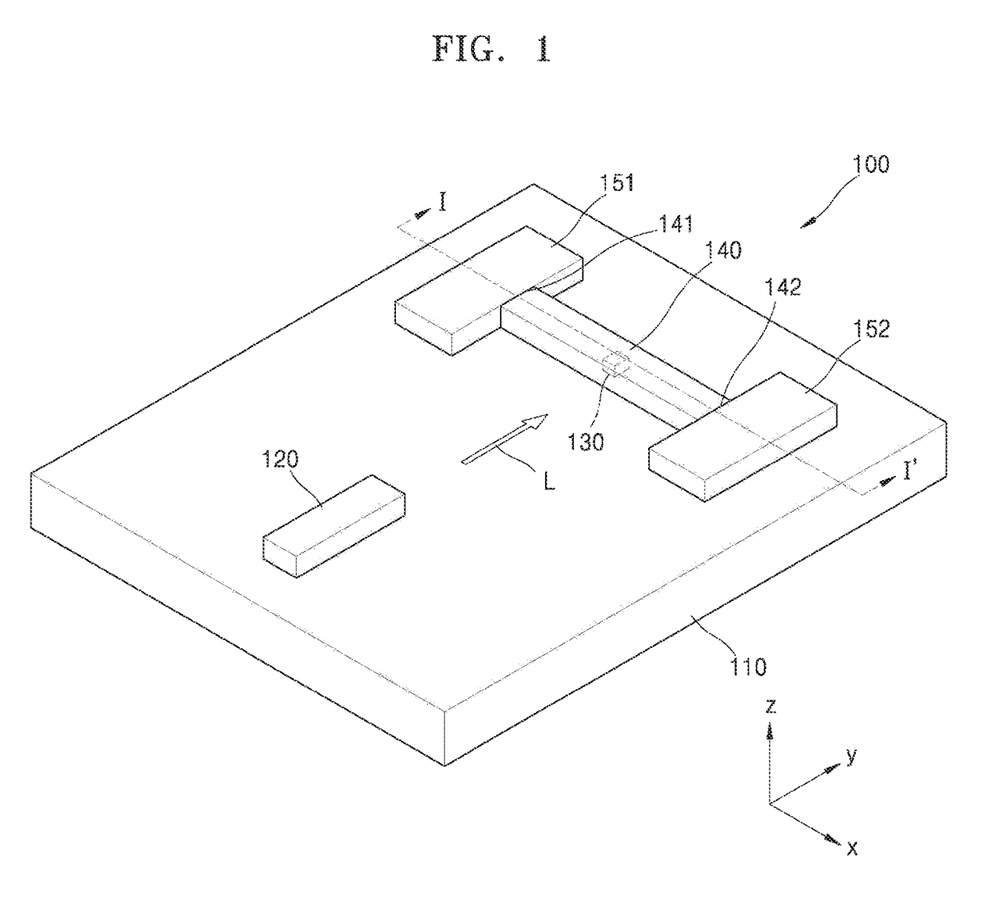
FIG. 1 is a perspective view of a random number generator according to an example embodiment.
Figure 2:
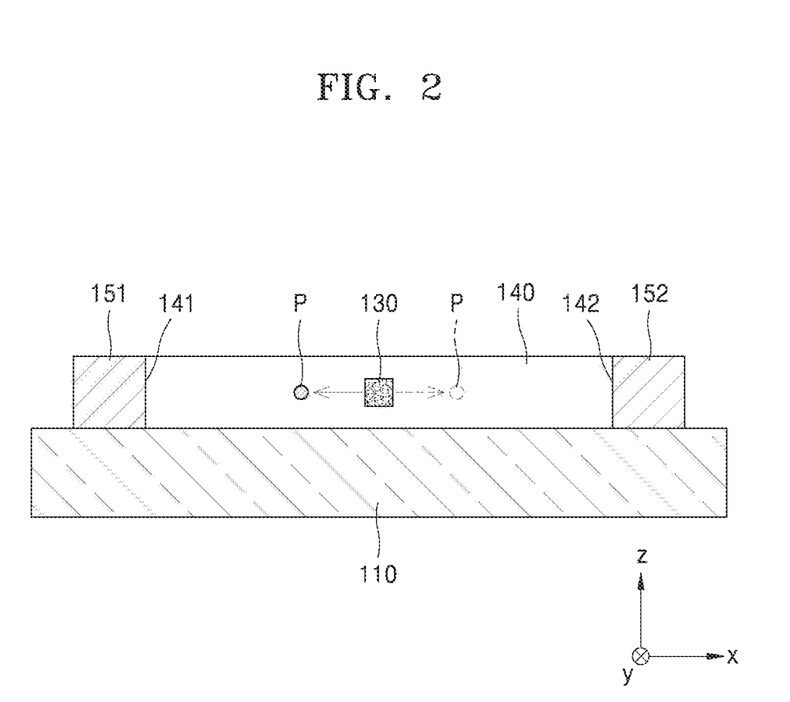
FIG. 2 is a cross-sectional view taken along line I-I' of FIG. 1.

FIG. 1 is a perspective view of a random number generator 100 according to an example embodiment. FIG. 2 is a cross-sectional view taken along line I-I' of FIG. 1.

Referring to FIGS. 1 and 2, the random number generator 100 may include a single-photon emitter 130, a waveguide 140, and a first single-photon detector 151 and a second single-photon detector 152. The single-photon emitter 130 is provided in the waveguide 140, and the first single-photon detector 151 and the second single-photon detector 152 are provided respectively at both ends of the waveguide 140.

The single-photon emitter 130, the waveguide 140, and the first single-photon detector 151 and the second single-photon detector 152 may be provided on a substrate 110. A semiconductor substrate such as a silicon substrate may be used as the substrate 110. However, example embodiments are not limited thereto.

The single-photon emitter 130 may emit single photons P as illustrated in FIG. 2 by optical pumping. An optical pumping source 120 for emitting light to the single-photon emitter 130 may be provided on the substrate 110. The optical pumping source 120 may include, for example, a laser light source 120 for emitting laser light L.

The laser light source 120 may allow the single-photon emitter 130 to emit the single photons P by radiating the laser light L to the single-photon emitter 130 provided in the waveguide 140. For example, a laser diode may be used as the laser light source 120, but example embodiments are not limited thereto. The laser light source 120 may emit, for example, the laser light L of a pulse type. However, example embodiments are not limited thereto, and laser light source may emit laser light L of a continuous waveform.

The single-photon emitter 130 may sequentially emit the single photons P by the irradiation of the laser light L emitted from the laser light source 120. The single-photon emitter 130 may include, for example, a quantum dot (QD). A quantum dot is a semiconductor particle having a size of about several nanometers and may include, for example, cadmium selenide (CdSe), cadmium sulfide (CdS), lead selenide (PbSe), lead sulfide (PbS), indium arsenide (InAs), indium phosphide (InP), or cadmium selenide sulfide (CdSeS). However, this is merely exemplary and the quantum dot may include various other semiconductor materials. The quantum dot may have, for example, a core-shell structure, but example embodiments are not limited thereto.

When the laser light L emitted from the laser light source 120 is irradiated to the quantum dot, the quantum dot is excited and then returned to the original state. During the excitation of the quantum dot, the single photons P having specific energy may be sequentially emitted.

The single photons P emitted from the single-photon emitter 130 may be formed in the waveguide 140. In detail, the single photons P emitted from the single-photon emitter 130 may be formed directly in the waveguide 140 without a separate coupling process.

The waveguide 140 may guide the progression of the single photons P emitted from the single-photon emitter 130. When the substrate 110 includes, for example, silicon, the waveguide 140 may include, for example, silicon or silicon oxide. However, this is merely exemplary and, in addition thereto, the waveguide 140 may include various materials capable of guiding the progression of the photons P.

A first output terminal 141 and a second output terminal 142, from which the single photons P emitted from the single-photon emitter 130 are output, are respectively provided at both end portions of the waveguide 140.

As illustrated in FIG. 2, each of the single photons P emitted from the single-photon emitter 130 may be output by randomly traveling in any one of a direction toward the first output terminal 141 of the waveguide 140, for example, in a −x-axis direction, and a direction toward the second output terminal 142 of the waveguide 140, for example, in a +x-axis direction. For example, as the probability that each of the single photons P in the waveguide 140 travels either in the direction toward the first output terminal 141, that is, the −x-axis direction, or in the direction toward the second output terminal 142, that is, the +x-axis direction, is 50% due to unbiasedness of the waveguide 140, whether each of the photons P of the waveguide 140 travels in the direction toward the first output terminal 141 or in the direction toward the second output terminal 142 may not be predicted.

The first single-photon detector 151 and the second single-photon detector 152 for detecting the single photons P are provided at the first output terminal 141 and the second output terminal 142, respectively. The first single-photon detector 151 may detect the single photons P output from the first output terminal 141 of the waveguide 140, and the second single-photon detector 152 may detect the single photons P output from the second output terminal 142 of the waveguide 140. Each of the first single-photon detector 151 and the second single-photon detector 152 may include, for example, a semiconductor detector, a charge-coupled device (CCD), or a photomultiplier tube detector. However, example embodiments are not limited thereto.

In the random number generator 100 according to an example embodiment, when the laser light L emitted from the laser light source 120 is irradiated to the single-photon emitter 130 provided in the waveguide 140, the single-photon emitter 130 sequentially emits the single photons P due to the optical pumping by the laser light source 120. Next, each of the single photons P emitted from the single-photon emitter 130 travels inside the waveguide 140 to be randomly output either in the direction toward the first output terminal 141 or in the direction toward the second output terminal 142. Next, the first single-photon detector 151 and the second single-photon detector 152 detect the single photons P output from the first output terminal 141 and the second output terminal 142, respectively.

As the single photons P are detected by the first single-photon detector 151 and the second single-photon detector 152, a random number may be generated. For example, when one single photon P emitted from the single-photon emitter 130 is output from the first output terminal 141 of the waveguide 140 and detected by the first single-photon detector 151, "0" may be set, and when the other single photon P emitted from the single-photon emitter 130 is output from the second output terminal 142 of the waveguide 140 and detected by the second single-photon detector 152, "1" may be set. A setting opposite to the above may be performed.

As such, one (1) bit may be determined according to whether each of the single photons P emitted from the single-photon emitter 130 is output from the first output terminal 141 or from the second output terminal 142. Accordingly, an unpredictable true random number may be generated by the single photons P that are sequentially emitted from the single-photon emitter 130.

A random number generator using quantum mechanical amorphousness of photons has been studied. However, the random number generator requires optical elements such as a polarized plate or mirror so that miniaturization of the random number generator may be difficult and costs may be increased. According to example embodiments, as all constituent elements such as the laser light source 120, the single-photon emitter 130, the waveguide 140, and the first single-photon detector 151 and the second single-photon detector 152 may be integrated on the substrate 110, the random number generator 100 may be implemented in a compact on-chip at a relatively low cost. Furthermore, an unpredictable true random number may be generated by using a quantum mechanical principle.

Figure 3:
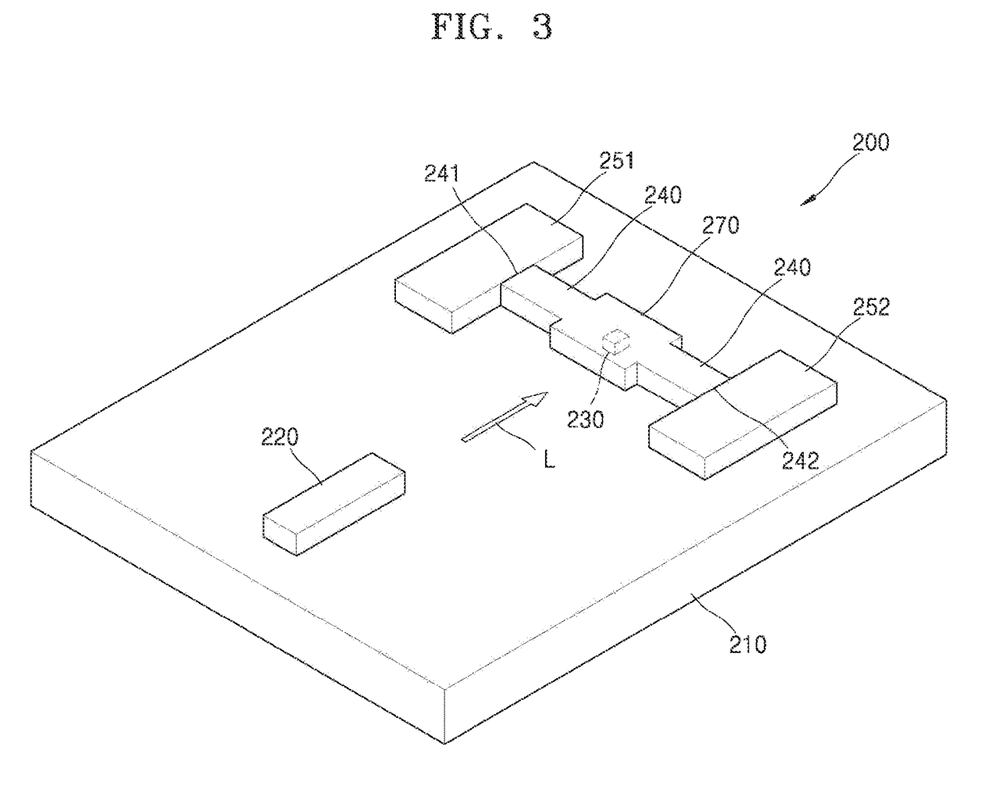
FIG. 3 is a perspective view of a random number generator according to an example embodiment.

FIG. 3 is a perspective view of a random number generator 200 according to an example embodiment. The following description mainly focuses on differences from the above-described example embodiment.

Referring to FIG. 3, the random number generator 200 may include a laser light source 220, a single-photon emitter 230, a waveguide 240, a resonator 270, and a first single-photon detector 251 and a second single-photon detector 252. The laser light source 220, the single-photon emitter 230, the waveguide 240, the resonator 270, and the first single-photon detector 251 and the second single-photon detector 252 may be provided on a substrate 210.

In the example embodiment, the resonator 270 for optical amplification is provided in the waveguide 240, and the single-photon emitter 230 is provided in the resonator 270. The first single-photon detector 251 and the second single-photon detector 252 are respectively provided at both end portions of the waveguide 240.

The laser light source 220, as an optical pumping source 220, radiates the laser light L to the single-photon emitter 230 so that single photons may be emitted from the single-photon emitter 230. A laser diode, for example, may be used as the laser light source 220, but example embodiments are not limited thereto. The laser light source 220 may emit, for example, the laser light L of a pulse type or the laser light L of a continuous waveform.

The single-photon emitter 230 may sequentially emit the single photons by the irradiation of the laser light L emitted from the laser light source 220. The single-photon emitter 230 may include, for example, a quantum dot, but example embodiments are not limited thereto.

The single-photon emitter 230 may be provided in the resonator 270. Accordingly, the single photons emitted from the single-photon emitter 230 may be formed in the resonator 270 by the irradiation of the laser light L emitted from the laser light source 220. The resonator 270 may amplify the light generated from the single-photon emitter 230 by using a mirror structure provided therein and output the amplified light toward the waveguide 240.

The waveguide 240 may guide the progression of the single photons generated by the single-photon emitter 230 and amplified by the resonator 270. A first output terminal 241 and a second output terminal 242 for outputting single photons are respectively provided at both end portions of the waveguide 240. The first single-photon detector 251 and the second single-photon detector 252 for detecting photons are provided at the first output terminal 241 and the second output terminal 242, respectively. The first single-photon detector 251 may detect the single photons output from the first output terminal 241 of the waveguide 240, and the second single-photon detector 252 may detect the single photons output from the second output terminal 242 of the waveguide 240.

As described above, each of the single photons emitted from the single-photon emitter 230 is amplified by the resonator 270 and then randomly travels to be output in any one of a direction toward the first output terminal 241 of the waveguide 240 and a direction toward the second output terminal 242 of the waveguide 240. As the randomly output single photons are detected by the first single-photon detector 251 and the second single-photon detector 252, a random number may be generated.

According to the example embodiment, in the random number generator 200, as the resonator 270 for optical amplification is provided in the waveguide 240, pumping efficiency may be improved. Accordingly, single-photon detection efficiency may be improved.

Figure 4:
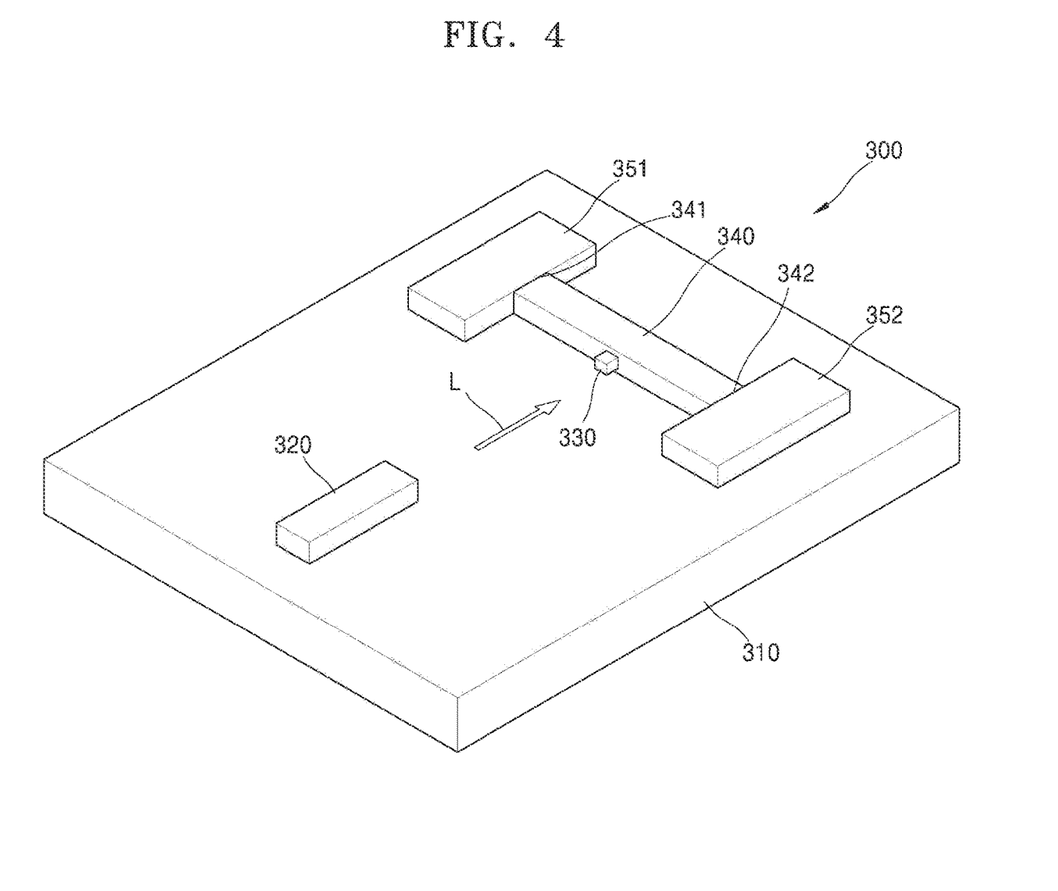
FIG. 4 is a perspective view of a random number generator according to an example embodiment.

FIG. 4 is a perspective view of a random number generator 300 according to an example embodiment.

Referring to FIG. 4, the random number generator 300 may include a laser light source 320, a single-photon emitter 330, a waveguide 340, and a first single-photon detector 351 and a second single-photon detector 352. The laser light source 320, the single-photon emitter 330, the waveguide 340, and the first single-photon detector 351 and the second single-photon detector 352 may be provided on a substrate 310. In the example embodiment, the single-photon emitter 330 is provided outside of the waveguide 340, and the first single-photon detector 351 and the second single-photon detector 352 are respectively provided at both end portions of the waveguide 340.

The laser light source 320, as an optical pumping source 320, radiates the laser light L to the single-photon emitter 330 so that the single-photon emitter 330 may emit single photons. A laser diode, for example, may be used as the laser light source 320, but example embodiments are not limited thereto. The laser light source 320 may emit, for example, the laser light L of a pulse type or the laser light L of a continuous waveform.

The single-photon emitter 330 may emit the single photons by the irradiation of the laser light L emitted from the laser light source 320. The single-photon emitter 330 may include, for example, a quantum dot, but example embodiments are not limited thereto. The single-photon emitter 330 may be provided outside the waveguide 340. FIG. 4 illustrates an example in which the single-photon emitter 330 is provided outside of the waveguide 340 and in contact with the waveguide 340. However, example embodiments are not limited thereto, and the single-photon emitter 330 may be provided outside of the waveguide 340 and spaced apart from the waveguide 340.

The single photons emitted from the single-photon emitter 330 may be formed in the waveguide 340. For example, the light generated from the single-photon emitter 330 may be input to the inside of the waveguide 340 without a separate coupling device. Accordingly, the single photons emitted from the single-photon emitter 330 may be formed directly in the waveguide 340.

The waveguide 340 may guide the progression of the single photons emitted from the single-photon emitter 330. A first output terminal 341 and a second output terminal 342 for outputting the single photons emitted from the single-photon emitter 330 are respectively provided at both end portions of the waveguide 340.

The first single-photon detector 351 and the second single-photon detector 352 for detecting the single photons are provided at the first output terminal 341 and the second output terminal 342, respectively. The first single-photon detector 351 may detect the single photons output from the first output terminal 341 of the waveguide 340, and the second single-photon detector 352 may detect the single photons output from the second output terminal 342 of the waveguide 340.

As described above, each of the single photons emitted from the single-photon emitter 330 may be output by randomly traveling in any one of a direction toward the first output terminal 341 of the waveguide 340 and a direction toward the second output terminal 342 of the waveguide 340. As the randomly output single photons are detected by the first single-photon detector 351 and the second single-photon detector 352, a random number may be generated.

Figure 5:
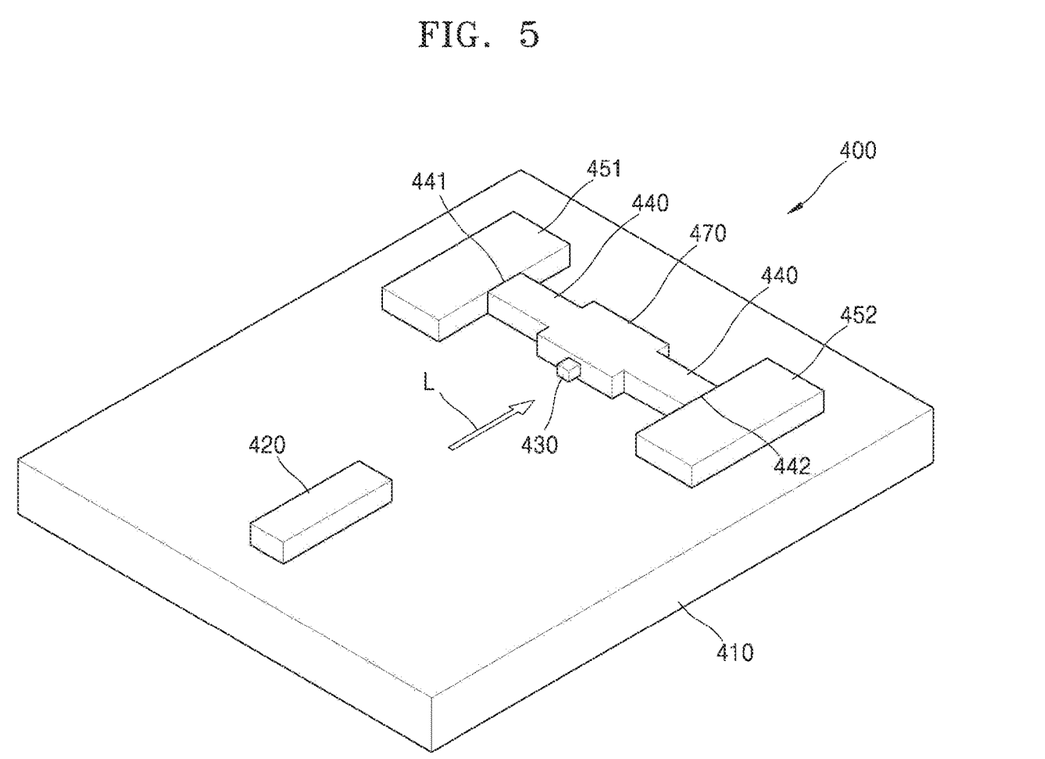
FIG. 5 is a perspective view of a random number generator according to an example embodiment.

FIG. 5 is a perspective view of a random number generator 400 according to an example embodiment.

Referring to FIG. 5, the random number generator 400 may include a laser light source 420, a single-photon emitter 430, a waveguide 440, a resonator 470, and a first single-photon detector 451 and a second single-photon detector 452. The laser light source 420, the single-photon emitter 430, the waveguide 440, the resonator 470, and the single-photon detector 451 and the second single-photon detector 452 may be provided on a substrate 410.

In the example embodiment, the resonator 470 is provided in waveguide 440, and the single-photon emitter 430 is provided outside the resonator 470. The first single-photon detector 451 and the second single-photon detector 452 are respectively provided at both end portions of the waveguide 440.

The laser light source 420, as an optical pumping source 420, radiates the laser light L to the single-photon emitter 430 so that the single-photon emitter 430 may emit single photons. A laser diode, for example, may be used as the laser light source 420, but example embodiments are not limited thereto.

The single-photon emitter 430 may emit the single photons by the irradiation of the laser light L emitted from the laser light source 420. The single-photon emitter 430 may include, for example, a quantum dot, but example embodiments are not limited thereto. The single-photon emitter 430 may be provided outside the resonator 470. Although FIG. 5 illustrates that the single-photon emitter 430 is provided outside of and in contact with the resonator 470, the single-photon emitter 430 may be provided outside of the resonator 470 and spaced apart from the resonator 470.

The single photons emitted from the single-photon emitter 430 may be formed in the resonator 440. In detail, the light generated by the single-photon emitter 430 may be input to the inside of the resonator 470 without a separate coupling device. Accordingly, the single photons emitted from the single-photon emitter 430 may be formed directly in the resonator 470.

The resonator 470 may output the light by amplifying the light using a mirror structure, and may amplify the light generated from the single-photon emitter 430 and output the amplified light toward the waveguide 440. Accordingly, the single-photon detection efficiency may be improved.

The waveguide 440 may guide the progression of the single photons emitted by the single-photon emitter 430 and amplified by the resonator 470. A first output terminal 441 and a second output terminal 442 for emitting the single photons are respectively provided at both end portions of the waveguide 440. The first single-photon detector 451 and the second single-photon detector 452 for detecting the single photons are provided at the first output terminal 441 and the second output terminal 442, respectively. The first single-photon detector 451 may detect the single photons output from the first output terminal 441 of the waveguide 440, and the second single-photon detector 452 may detect the single photons output from the second output terminal 442 of the waveguide 440.

As described above, each of the single photons emitted from the single-photon emitter 430 is amplified by the resonator 470 and then may be output by randomly traveling in any one of a direction toward the first output terminal 441 of the waveguide 440 and a direction toward the second output terminal 442 of the waveguide 440. As the randomly output single photons are detected by the first single-photon detector 451 and the second single-photon detector 452, a random number may be generated.

Figure 6:
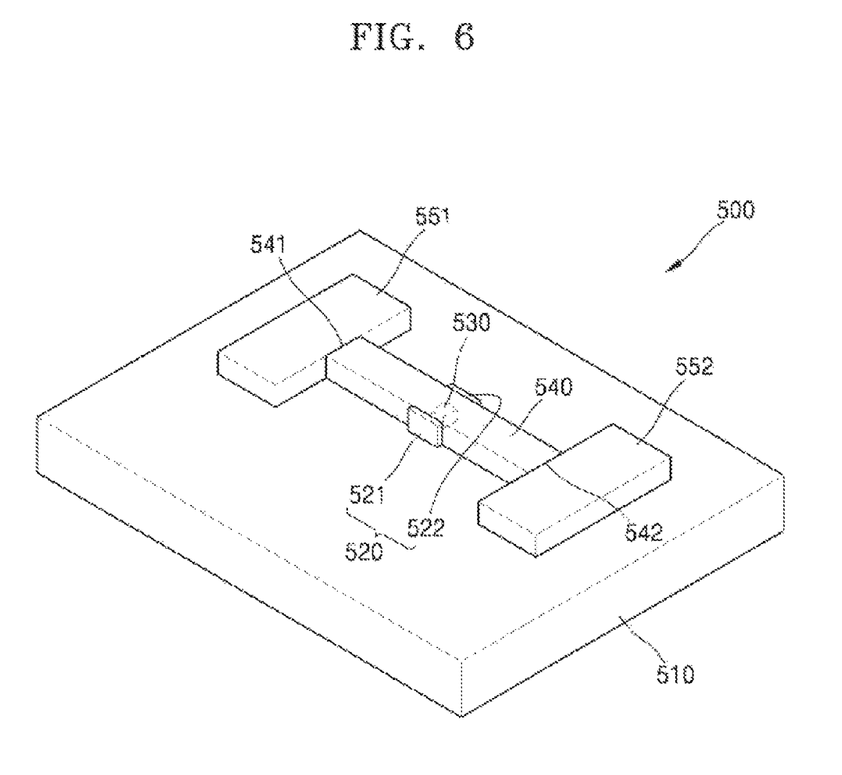
FIG. 6 is a perspective view of a random number generator according to an example embodiment.

FIG. 6 is a perspective view of a random number generator 500 according to an example embodiment.

Referring to FIG. 6, the random number generator 500 may include a single-photon emitter 530, a waveguide 540, and a first single-photon detector 551 and a second single-photon detector 552. The single-photon emitter 530 is provided in the waveguide 540, and the first single-photon detector 551 and the second single-photon detector 552 are respectively provided at both end portions of the waveguide 540, respectively.

The single-photon emitter 530, the waveguide 540, and the first single-photon detector 551 and the second single-photon detector 552 may be provided on a substrate 510. A semiconductor substrate such as a silicon substrate may be used as the substrate 510. However, example embodiments are not limited thereto.

The single-photon emitter 530 may emit single photons by electrical pumping. An electrical pumping source 520 may be provided on the substrate 510. The electrical pumping source 520 may include a first electrode 521 and a second electrode 522 for applying an electric field to the single-photon emitter 530.

As the first electrode 521 and the second electrode 522 apply an electric field to the single-photon emitter 530 provided in the waveguide 540, the single-photon emitter 530 may emit single photons. The first electrode 521 and the second electrode 522 may be provided outside the waveguide 540. FIG. 6 illustrates that the first electrode 521 and the second electrode 522 are provided in contact with opposite outer surfaces of the waveguide 540 with the single-photon emitter being provided between the first electrode 521 and the second electrode 522, but example embodiments are not limited thereto, and the first electrode 521 and the second electrode 522 may be provided outside of the waveguide 540 and space apart from the waveguide 540.

The single-photon emitter 530 may emit the single photons by an electric field formed by a voltage difference applied between the first electrode 521 and the second electrode 522. The single-photon emitter 530 may include, for example, a quantum dot. A quantum dot is a semiconductor particle having a size of about several nanometers and may include, for example, CdSe, CdS, PbSe, PbS, InAs, InP, or CdSeS. However, this is merely exemplary and the quantum dot may include various other semiconductor materials. The quantum dot may have, for example, a core-shell structure, but example embodiments are not limited thereto.

The single photons emitted from the single-photon emitter 530 may be formed in the waveguide 540. The single photons emitted from the single-photon emitter 530 may be formed directly in the waveguide 540 without a separate coupling process.

The waveguide 540 may guide the progression of the single photons emitted from the single-photon emitter 530. When the substrate 510 includes, for example, silicon, the waveguide 540 may include, for example, silicon or silicon oxide. However, this is merely exemplary, and the waveguide 540 may include various materials capable of guiding the progression of the single photons. A first output terminal 541 and a second output terminal 542 for outputting the single photons emitted from the single-photon emitter 530 are respectively provided at both end portions of the waveguide 540.

Each of the single photons emitted from the single-photon emitter 530 may be output by randomly traveling in any one of a direction toward the first output terminal 541 of the waveguide 540 and a direction toward the second output terminal 542 of the waveguide 540.

The first single-photon detectors 551 and the second single-photon detector 552 for detecting the single photons are provided at the first output terminal 541 and the second output terminal 542, respectively. The first single-photon detector 551 may detect the single photons output from the first output terminal 541 of the waveguide 540, and the second single-photon detector 552 may detect the single photons output from the second output terminal 542 of the waveguide 540. Each of the first single-photon detectors 551 and the second single-photon detector 552 may include, for example, a semiconductor detector, a CCD, or a photomultiplier tube detector. However, example embodiments are not limited thereto.

In the random number generator 500 configured as above, when an electric field is applied by the first electrode 521 and the second electrode 522 to the single-photon emitter 530 provided in the waveguide 540, the single-photon emitter 530 may emit the single photons by electrical pumping. Next, each of the single photons emitted from the single-photon emitter 530 traveling inside the waveguide 540 may randomly travel either in the direction toward the first output terminal 541 or the direction toward the second output terminal 542 to be output from the first output terminal 541 or the second output terminal 542. Next, as the first single-photon detector 551 and the second single-photon detector 552 detect the single photons output from the first output terminal 541 and the second output terminal 542, respectively, random numbers may be generated.

As such, one (1) bit may be determined according to whether each of the single photons emitted from the single-photon emitter 530 is output from the first output terminal 541 or from the second output terminal 542. Accordingly, an unpredictable true random number may be generated by the single photons that are sequentially emitted from the single-photon emitter 530. Furthermore, as all constituent elements forming the random number generator 500 are integrated on the substrate 510, the random number generator 500 may be implemented in a compact on-chip at a relatively low cost.

Figure 7:
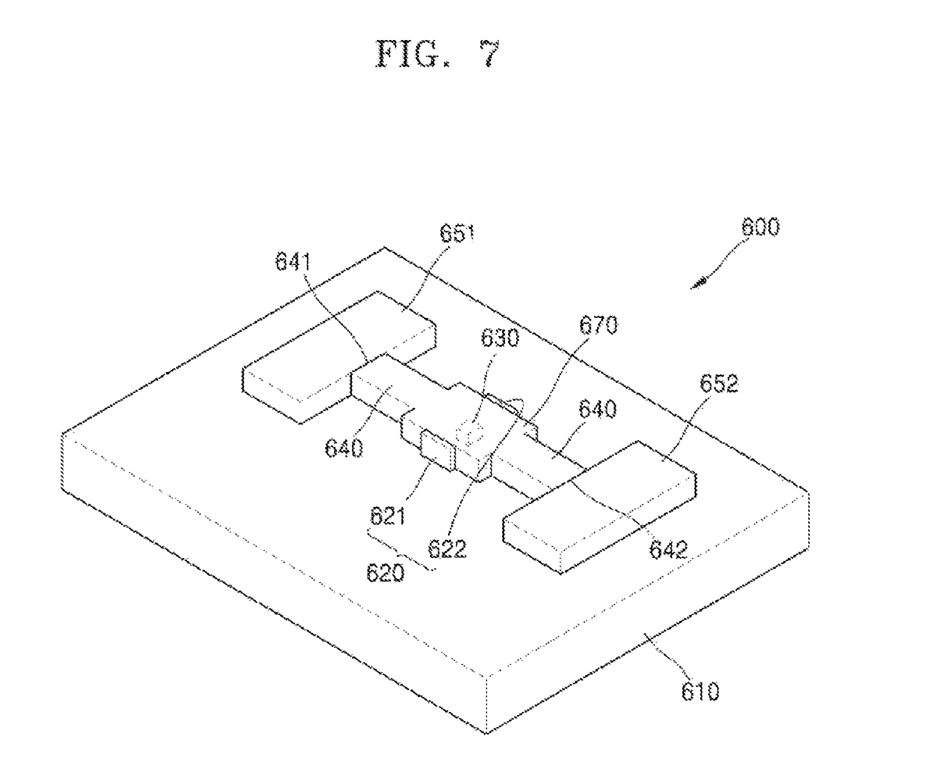
FIG. 7 is a perspective view of a random number generator according to an example embodiment.

FIG. 7 is a perspective view of a random number generator 600 according to an example embodiment.

Referring to FIG. 7, the random number generator 600 may include a single-photon emitter 630, a waveguide 640, a resonator 670, and a first single-photon detector 651 and a second single-photon detector 652. The single-photon emitter 630, the waveguide 640, the resonator 670, and the first single-photon detector 651 and the second single-photon detector 652 may be provided on a substrate 610.

In the example embodiment, the resonator 670 for optical amplification is provided in the waveguide 640. The single-photon emitter 630 is provided in the resonator 670. The first single-photon detector 651 and the second single-photon detector 652 are respectively provided at both end portions of the waveguide 640.

An electrical pumping source 620 may be provided on the substrate 610. The electrical pumping source 620 may include a first electrode 621 and a second electrode 622 for applying an electric field to the single-photon emitter 630.

As the first electrode 621 and the second electrode 622 apply an electric field to the single-photon emitter 530 provided in the waveguide 640, the single-photon emitter 630 may emit single photons.

The first electrode 621 and the second electrode 622 may be provided outside the resonator 670. The first electrode 621 and second electrode 622 may be provided outside of and in contact with an outer surface of the resonator 670 or provided outside of the resonator 670 and spaced apart from the resonator 670. The single-photon emitter 630 may emit single photons by the electric field applied by the first electrode 621 and the second electrode 622. The single-photon emitter 630 may include, for example, a quantum dot, but example embodiments are not limited thereto.

The single-photon emitter 630 is provided in the resonator 670. Accordingly, the single photons emitted from the single-photon emitter 630 may be formed in the resonator 670. The resonator 670 that amplifies and outputs light may amplify the light generated by the single-photon emitter 630 to be output toward the waveguide 640.

The waveguide 640 may guide the progression of the single photons generated by the single-photon emitter 630 and amplified by the resonator 670. A first output terminal 641 and a second output terminal 642, from which the single photons are output, are respectively provided at both end portions of the waveguide 640. The first single-photon detector 651 and the second single-photon detector 652 for detecting the single photons are provided at the first output terminal 641 and the second output terminal 642, respectively. The first single-photon detector 651 may detect the single photons output from the first output terminal 641 of the waveguide 640, and the second single-photon detector 652 may detect the single photons output from the second output terminal 642 of the waveguide 640.

As described above, each of the single photons emitted from the single-photon emitter 630 is amplified by the resonator 670 and then output by randomly traveling in any one of the direction toward the first output terminal 641 of the waveguide 640 and the direction toward the second output terminal 642 of the waveguide 640. As the randomly output single photons are detected by the first single-photon detector 651 and the second single-photon detector 652, a random number may be generated.

According to the example embodiment, in the random number generator 600, as the resonator 670 for optical amplification is provided in the waveguide 640, pumping efficiency may be improved. Accordingly, the single-photon detection efficiency may be improved.

Figure 8:
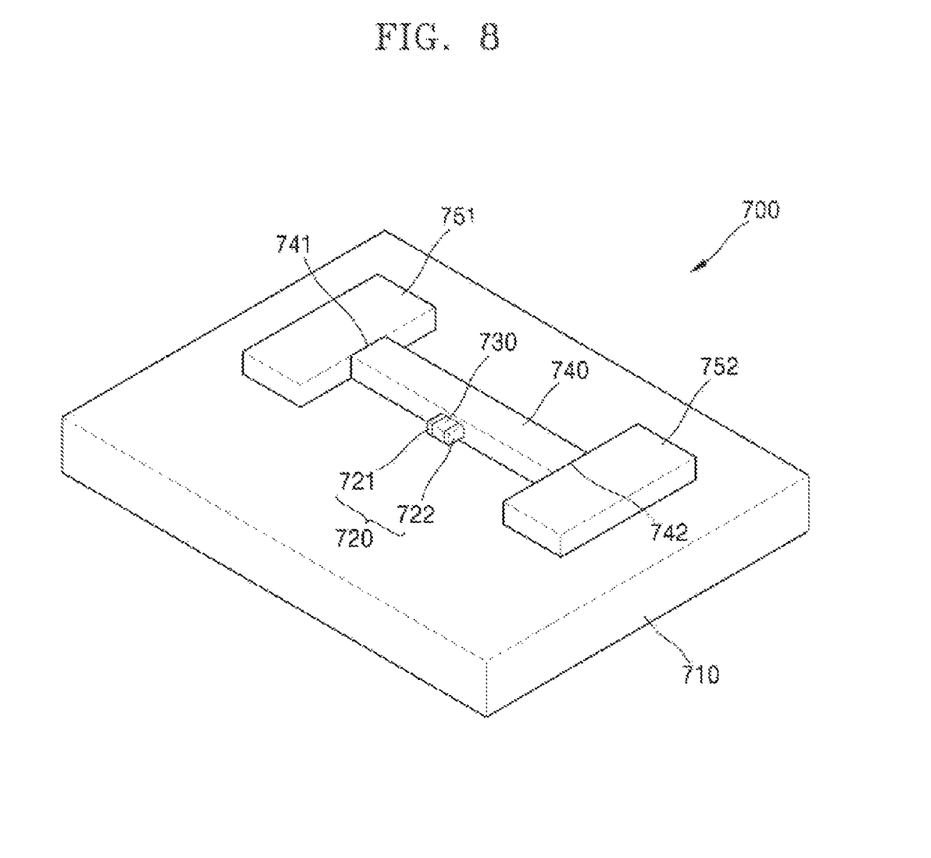
FIG. 8 is a perspective view of a random number generator according to an example embodiment.

FIG. 8 is a perspective view of a random number generator 700 according to an example embodiment.

Referring to FIG. 8, the random number generator 700 may include a single-photon emitter 730, a waveguide 740, and a first single-photon detector 751 and a second single-photon detector 752. The single-photon emitter 730, the waveguide 740, and the first single-photon detector 751 and the second single-photon detector 752 may be provided on a substrate 710. In the example embodiment, the single-photon emitter 730 is provided outside the waveguide 740, and the first single-photon detector 751 and the second single-photon detector 752 are respectively provided at both end portions of the waveguide 740.

An electrical pumping source 720 may be provided on the substrate 710. The electrical pumping source 720 may include a first electrode 721 and a second electrode 722 for applying an electric field to the single-photon emitter 730. As the first electrode 721 and the second electrode 722 apply an electric field to the single-photon emitter 730 provided outside the waveguide 740, the single-photon emitter 730 may emit single photons.

The single-photon emitter 730 may include, for example, a quantum dot that emits single photons by the application of an electric field. However, example embodiments are not limited thereto. The single-photon emitter 730 may be provided outside of and in contact with the waveguide 740 or outside of the waveguide 740 and spaced apart from the waveguide 740.

The first electrode 721 and the second electrode 722 may be provided at both end portions of the single-photon emitter 730. FIG. 8 illustrates that the first electrode 721 and the second electrode 722 are provided in contact with the single-photon emitter 730. However, this is merely exemplary, and the first electrode 721 and the second electrode 722 may be provided outside the single-photon emitter 730 and spaced apart from the single-photon emitter 730.

The single photons emitted from the single-photon emitter 730 may be formed in the waveguide 740. For example, the light generated by the single-photon emitter 730 may be input to the inside of the waveguide 740 without a separate coupling device. Accordingly, the single photons emitted from the single-photon emitter 730 may be formed directly in the waveguide 740.

The waveguide 740 may guide the progression of the single photons emitted from the single-photon emitter 730. A first output terminal 741 and a second output terminal 742, from which the single photons emitted from the single-photon emitter 730 are output, are respectively provided at both end portions of the waveguide 740.

The first single-photon detector 751 and the second single-photon detector 752 for detecting the single photons are provided at the first output terminal 741 and the second output terminal 742, respectively. The first single-photon detector 751 may detect the single photons output from the first output terminal 741 of the waveguide 740, and the second single-photon detector 752 may detect the single photons output from the second output terminal 742 of the waveguide 740.

Each of the single photons emitted from the single-photon emitter 730 may be output by randomly traveling in any one of a direction toward the first output terminal 741 of the waveguide 740 and a direction toward the second output terminal 742 of the waveguide 740. As the randomly output single photons are detected by the first single-photon detector 751 and the second single-photon detector 752, a random number may be generated.

Figure 9:
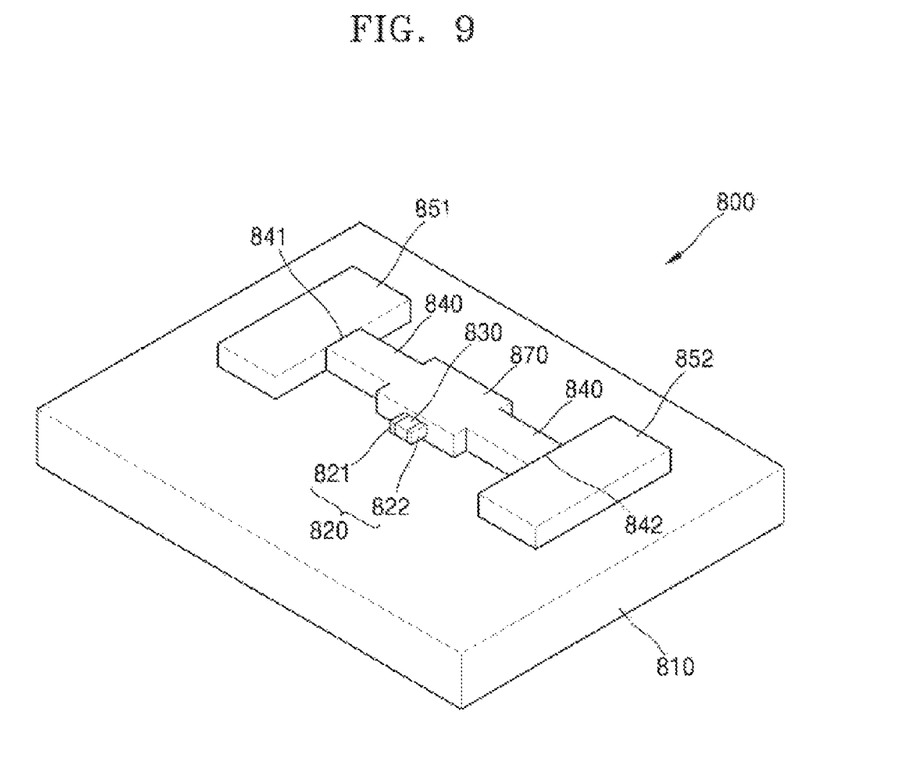
FIG. 9 is a perspective view of a random number generator according to an example embodiment.

FIG. 9 is a perspective view of a random number generator 800 according to an example embodiment.

Referring to FIG. 9, the random number generator 800 may include a single-photon emitter 830, a waveguide 840, a resonator 870, and a first single-photon detector 851 and a second single-photon detector 852. The single-photon emitter 830, the waveguide 840, the resonator 870, and the first single-photon detector 851 and the second single-photon detector 852 may be provided on a substrate 810. In the example embodiment, the resonator 870 is provided in the waveguide 840, and the single-photon emitter 830 is provided outside of the resonator 870. The first single-photon detector 851 and the second single-photon detector 852 are respectively provided at both end portions of the waveguide 840.

An electrical pumping source 820 may be provided on the substrate 810. The electrical pumping source 820 may include a first electrode 821 and a second electrode 822 for applying an electric field to the single-photon emitter 830.

As the first electrode 821 and the second electrode 822 apply an electric field to the single-photon emitter 830 provided outside of the resonator 870, the single-photon emitter 830 may emit single photons.

The single-photon emitter 830 may include, for example, a quantum dot that emits single photons by the application of an electric field. However, example embodiments are not limited thereto. The single-photon emitter 830 may be provided outside of and in contact with the resonator 870 or outside of the resonator 870 and spaced apart from the resonator 870.

The first electrode 821 and the second electrode 822 may be provided at both sides of the single-photon emitter 830. The first electrode 821 and the second electrode 822 may be provided in contact with the single-photon emitter 830 or around the single-photon emitter 830 to be apart from the single-photon emitter 830.

The photons emitted from the single-photon emitter 830 may be formed in the resonator 870. For example, the light generated by the single-photon emitter 830 may be input to the inside of the resonator 870 without a separate coupling device, Accordingly, the single photons emitted from the single-photon emitter 830 may be formed directly in the resonator 870. As the resonator 870 may amplify the light generated by the single-photon emitter 830 and output the amplified light toward the waveguide 840, the single-photon detection efficiency may be improved.

The waveguide 840 may guide the progression of the single photons emitted by the single-photon emitter 830 and amplified by the resonator 870. A first output terminal 841 and a second output terminal 842 for emitting the single photons are respectively provided at both end portions of the waveguide 840. The first single-photon detector 851 and the second single-photon detector 852 for detecting the single photons are provided at the first output terminal 841 and the second output terminal 842, respectively. The first single-photon detector 851 may detect the single photons output from the first output terminal 841 of the waveguide 840, and the second single-photon detector 852 may detect the single photons output from the second output terminal 842 of the waveguide 840.

Each of the single photons emitted from the single-photon emitter 830 is amplified by the resonator 870 and may be output by randomly traveling in any one of a direction toward the first output terminal 841 of the waveguide 840 and a direction toward the second output terminal 842 of the waveguide 840. As the randomly output single photons are detected by the first single-photon detector 851 and the second single-photon detector 852, a random number may be generated.

According to the example embodiments, since all constituent elements such as a pumping source, a single-photon emitter, a waveguide, a single-photon detector, etc. may be integrated on a substrate, a random number generator may be implemented in a compact on-chip type at a relatively low cost. Furthermore, unpredictable true random numbers may be generated by using a quantum mechanical principle.

It should be understood that example embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A random number generator comprising:
   an optical pumping source;
   a single-photon emitter configured to emit single photons by pumping of the optical pumping source;
   a waveguide configured to guide the single photons emitted from the single-photon emitter to the inside of the waveguide;
   a resonator configured to optically amplify the single photons emitted from the single-photon emitter, the resonator provided in the waveguide; and
   a first single-photon detector and a second single-photon detector respectively provided at both end portions of the waveguide and configured to detect the single photons output from both end portions of the waveguide, respectively,
   wherein the optical pumping source, the single-photon emitter, the waveguide, the resonator, the first single-photon detector, and the second single-photon detector are integrated on a silicon substrate.

2. The random number generator of claim 1, wherein the optical pumping source comprises a laser diode.

3. The random number generator of claim 1, wherein the single-photon emitter is provided in the waveguide or outside of the waveguide.

4. The random number generator of claim 1, wherein the single-photon emitter comprises a quantum dot.

5. The random number generator of claim 1, wherein the waveguide comprises silicon or silicon oxide.

6. The random number generator of claim 1, wherein the first single-photon detector and the second single-photon detector each comprise a semiconductor detector.

7. The random number generator of claim 1, wherein the first single-photon detector or the second single-photon detector comprises a CIS (CMOS Image Sensor) or photodiode.

8. A random number generator comprising:
   an electrical pumping source comprising a first electrode and a second electrode configured to apply an electrical field;
   a single-photon emitter configured to emit single photons by pumping of the electrical pumping source;
   a waveguide configured to guide the single photons emitted from the single-photon emitter to the inside of the waveguide; and
   a first single-photon detector and a second single-photon detector respectively provided at both end portions of the waveguide and configured to detect the single photons output from both end portions of the waveguide, respectively,
   wherein the first electrode and the second electrode are provided on opposite surfaces of the waveguide,
   wherein the single-photon emitter is provided inside of the waveguide and between the first electrode and the second electrode, and
   wherein the electrical pumping source, the single-photon emitter, the waveguide, the first single-photon detector, and the second single-photon detector are integrated on a silicon substrate.

9. The random number generator of claim 8, wherein the single-photon emitter comprises a quantum dot.

10. The random number generator of claim 8, wherein the waveguide comprises silicon or silicon oxide.

11. The random number generator of claim 8, further comprising a resonator configured to optically amplify the single photons emitted from the single-photon emitter, the resonator being provided in the waveguide.

12. The random number generator of claim 8, wherein the first single-photon detector and the second single-photon detector each comprise a semiconductor detector.

13. The random number generator of claim 12, wherein the semiconductor detector comprises a CIS (CMOS Image Sensor) or photodiode.

14. An electronic apparatus including a security authentication device, the security authentication device comprising the random number generator of claim 1.

15. The electronic apparatus of claim 14, wherein the electronic apparatus comprises a smart telecommunication device.

16. An electronic apparatus including a security authentication device, the security authentication device comprising the random number generator of claim 8.

17. The electronic apparatus of claim 16, wherein the electronic apparatus comprises a smart telecommunication device.

* * * * *